United States Patent
Tsukada et al.

(10) Patent No.: US 10,490,336 B2
(45) Date of Patent: Nov. 26, 2019

(54) THREE-PHASE AC REACTOR HAVING EXTERNAL CONNECTION POSITION CHANGE UNIT AND MANUFACTURING METHOD THEREOF

(71) Applicant: FANUC CORPORATION, Yamanashi (JP)

(72) Inventors: Kenichi Tsukada, Yamanashi (JP); Kaname Matsumoto, Yamanashi (JP); Makoto Takeshita, Yamanashi (JP); Yuuichi Yamada, Yamanashi (JP); Masatomo Shirouzu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/650,333

(22) Filed: Jul. 14, 2017

(65) Prior Publication Data
US 2018/0025830 A1    Jan. 25, 2018

(30) Foreign Application Priority Data
Jul. 19, 2016 (JP) .................................. 2016-141678

(51) Int. Cl.
| H01F 27/29 | (2006.01) |
| H01F 27/28 | (2006.01) |
| H01F 41/076 | (2016.01) |
| H01F 27/22 | (2006.01) |
| H01F 27/245 | (2006.01) |
| H01F 27/30 | (2006.01) |
| H02M 3/24 | (2006.01) |
| H01F 37/00 | (2006.01) |

(52) U.S. Cl.
CPC ......... *H01F 27/2828* (2013.01); *H01F 27/22* (2013.01); *H01F 27/245* (2013.01); *H01F 27/29* (2013.01); *H01F 27/30* (2013.01); *H01F 37/00* (2013.01); *H01F 41/076* (2016.01); *H02M 3/24* (2013.01)

(58) Field of Classification Search
USPC ................. 336/198, 5, 170, 199, 184, 212
See application file for complete search history.

(56) References Cited

U.S. PATENT DOCUMENTS

| 4,912,618 | A | * | 3/1990 | Krinickas, Jr. ....... H01F 27/303 363/37 |
| 9,129,739 | B2 | | 9/2015 | Xu et al. |
| 9,343,221 | B2 | | 5/2016 | Nakatsu et al. |
| 9,881,728 | B2 | | 1/2018 | Honna et al. |

(Continued)

FOREIGN PATENT DOCUMENTS

| CN | 2645196 | 9/2004 |
| CN | 102306541 | 1/2012 |

(Continued)

*Primary Examiner* — Elvin G Enad
*Assistant Examiner* — Kazi S Hossain
(74) *Attorney, Agent, or Firm* — RatnerPrestia

(57) ABSTRACT

A three-phase AC reactor according to an embodiment of the present invention includes three-phase coils that are not arranged in parallel, an input and output terminal block having an input and output unit having a parallel arrangement, and an external connection position change unit disposed between a coil end of each of the three-phase coils and the input and output terminal block to connect the coil end to the input and output terminal block.

3 Claims, 13 Drawing Sheets

(56) References Cited

U.S. PATENT DOCUMENTS

| | | | |
|---|---|---|---|
| 9,899,135 B2 | 2/2018 | Nakanoue et al. | |
| 2003/0206087 A1* | 11/2003 | Raff | H01F 3/12 336/182 |
| 2006/0279393 A1* | 12/2006 | Shudarek | H01F 27/263 336/198 |
| 2009/0261939 A1* | 10/2009 | Shudarek | H01F 3/10 336/212 |
| 2014/0002229 A1* | 1/2014 | Xu | H01F 27/263 336/210 |
| 2014/0049246 A1 | 2/2014 | De Vidts et al. | |
| 2014/0268896 A1 | 9/2014 | Kurita et al. | |
| 2015/0123479 A1 | 5/2015 | Kurita | |
| 2015/0179330 A1 | 6/2015 | Nakanoue et al. | |

FOREIGN PATENT DOCUMENTS

| | | |
|---|---|---|
| CN | 202487364 U | 10/2012 |
| CN | 104376990 A | 2/2015 |
| CN | 104471657 | 3/2015 |
| JP | S53062166 A | 6/1978 |
| JP | 2009-283706 A | 12/2009 |
| JP | 2012256807 A | 12/2012 |
| JP | 2014039037 A | 2/2014 |
| JP | 2015032718 A | 2/2015 |
| JP | 2015122484 A | 7/2015 |
| WO | WO 2012/157053 A1 | 5/2011 |
| WO | 2014033830 A1 | 3/2014 |
| WO | 2014073252 A1 | 5/2014 |

\* cited by examiner

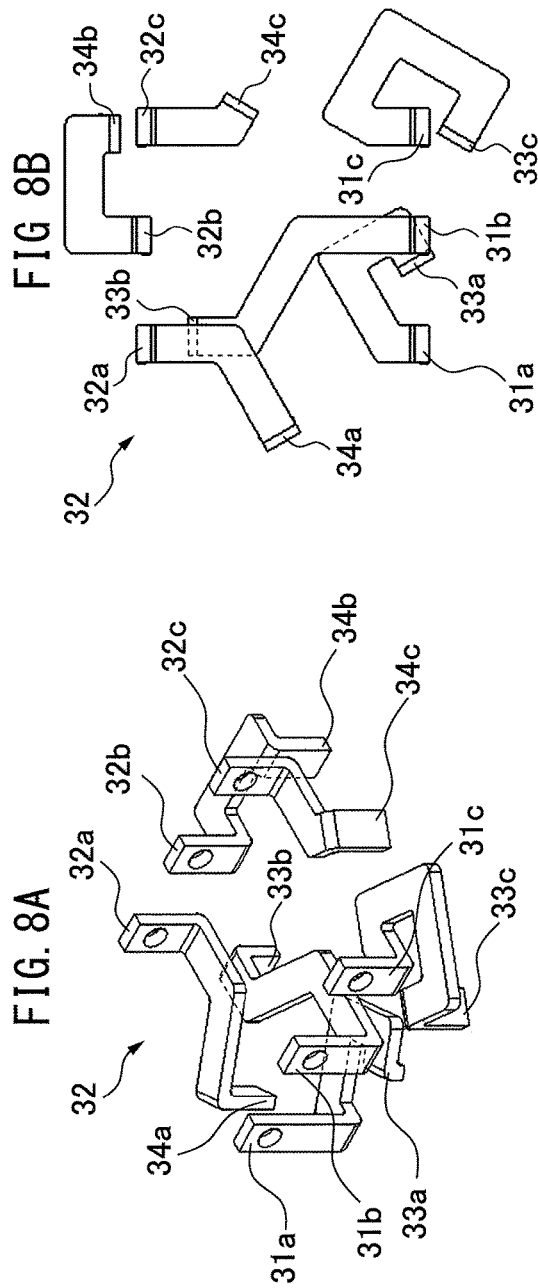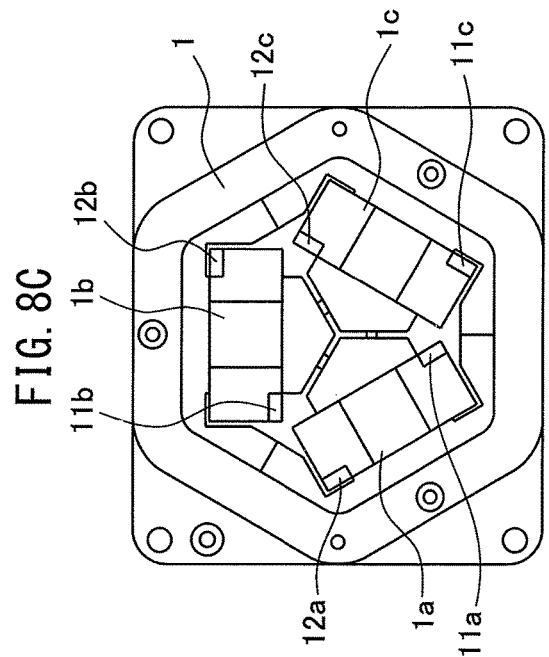

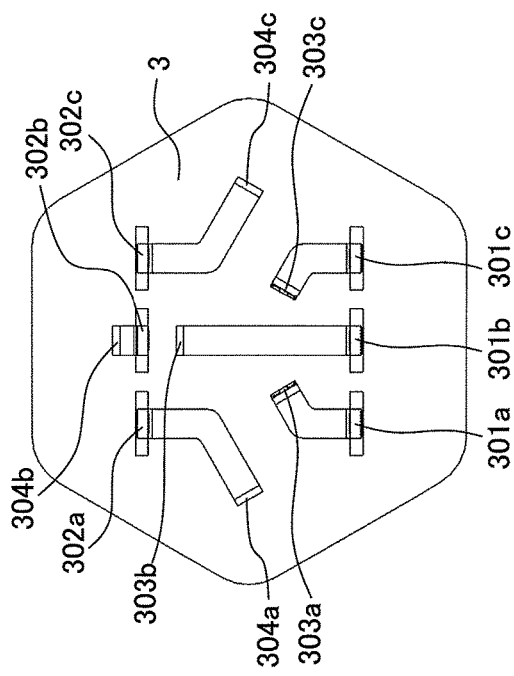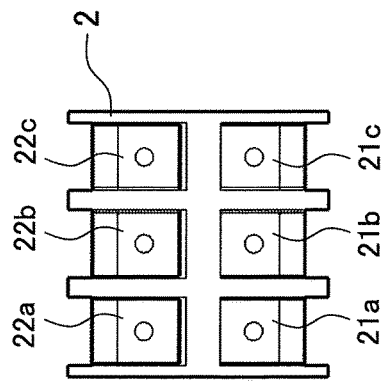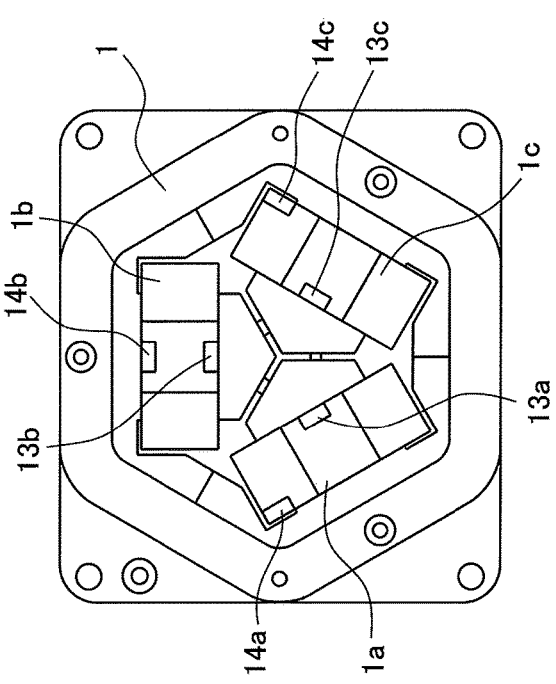

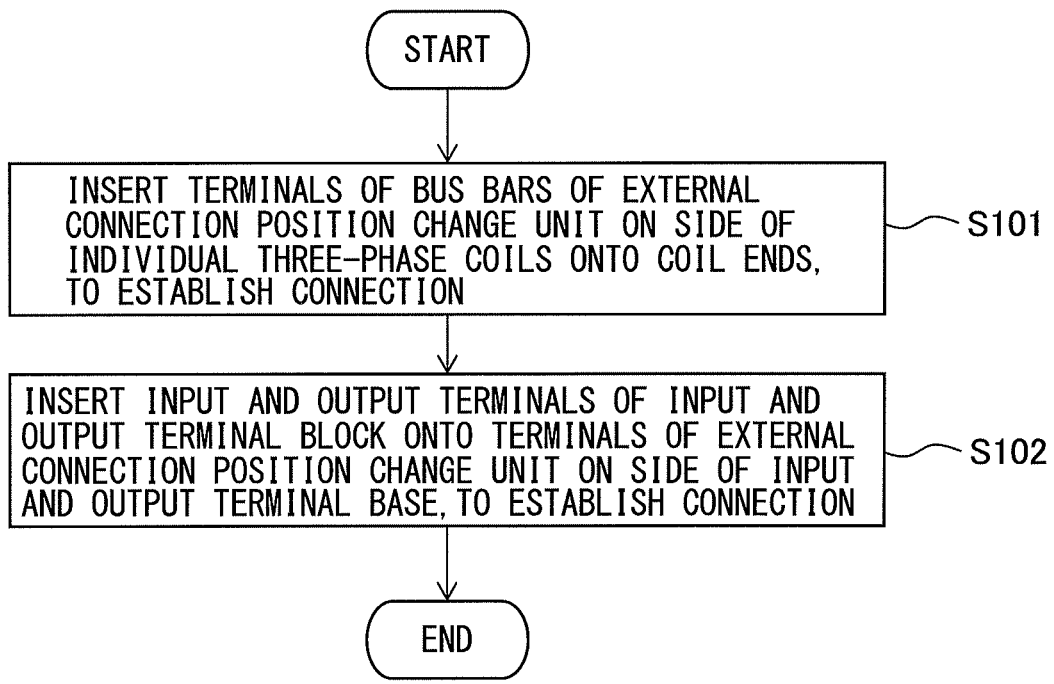

THREE-PHASE AC REACTOR HAVING EXTERNAL CONNECTION POSITION CHANGE UNIT AND MANUFACTURING METHOD THEREOF

This application is a new U.S. patent application that claims benefit of JP 2016-141678 filed on Jul. 19, 2016, the content of 2016-141678 is incorporated herein by reference.

BACKGROUND OF THE INVENTION

1. Field of the Invention

The present invention relates to a three-phase AC reactor, and in particular relates to a three-phase AC reactor that has an external connection position change unit disposed between coil ends of coils and an input and output terminal block.

2. Description of Related Art

Alternating current (AC) reactors are used in order to suppress harmonic current occurring in inverters and the like, to improve input power factors, or to reduce inrush current to inverters. An AC reactor has a core made of a magnetic material and a coil formed around the outside of the core.

FIG. 1 shows the structure of a conventional three-phase AC reactor (for example, Japanese Unexamined Patent Publication (Kokai) No. 2009-283706). A conventional three-phase AC reactor 1000 includes three-phase coils 101a, 101b, and 101c aligned in the directions of the double-headed arrow of FIG. 1. The coils 101a, 101b, and 101c have output terminals 210a, 210b, and 210c, and input terminals 220a, 220b, and 220c, respectively. In the conventional three-phase AC reactor, as shown in FIG. 1, the three-phase coils are arranged (apposed) in parallel and in a linear manner, and each coil and its input and output terminals are aligned. Thus, it is easy to connect a general-purpose input and output terminal block having linearly arranged input and output terminals to the input and output terminals of the three-phase AC reactor.

However, there are also three-phase AC reactors having three-phase coils that are arranged (apposed) neither in parallel nor in a linear manner in recent years (for example, International Publication No. 2012/157053). FIG. 2A is a perspective view of a conventional reactor device, and FIG. 2B is a plan view of the conventional reactor device. A conventional reactor device 2000 includes yoke cores 911a and 911b, three magnetic leg cores 931, three zero-phase magnetic leg cores 941, and three coils 921. The three coils 921 are disposed, for example, 120 degrees apart from each other with respect to the central axis of the yoke core 911a.

To connect a general-purpose input and output terminal block to such a three-phase AC reactor, bus bars or cables are required to connect between coil ends and the input and output terminal block. The coil ends that are arranged (apposed) neither in parallel nor in a linear manner cause difficulty in connection to the general-purpose input and output terminal block and connection to an external device. There are also concerns about an increase in production man-hours and the occurrence of operation errors.

SUMMARY OF THE INVENTION

The present invention aims at providing a three-phase AC reactor that is easily connected to an external device even if the three-phase coils are arranged (apposed) neither in parallel nor in a linear manner.

A three-phase AC reactor according to an embodiment of the present invention includes three-phase coils that are not arranged in parallel with each other, an input and output terminal block having an input and output unit having a parallel arrangement, and an external connection position change unit disposed between a coil end of each of the three-phase coils and the input and output terminal block so as to connect the coil end to the input and output terminal block.

BRIEF DESCRIPTION OF THE DRAWINGS

The objects, features, and advantages of the present invention will become more apparent from the following detailed description of an embodiment, along with accompanying drawings. In the accompanying drawings:

FIG. 8A is a perspective view of intersecting bus bars that constitute the external connection position change unit according to the embodiment of the present invention;

FIG. 8B is a plan view of the intersecting bus bars that constitute the external connection position change unit according to the embodiment of the present invention;

FIG. 8C is a plan view of the three-phase coils for the external connection position change unit of the three-phase AC reactor according to the embodiment of the present invention;

FIG. 9A is a plan view of the three-phase coils constituting the three-phase AC reactor according to the embodiment of the present invention;

FIG. 9B is a plan view of the external connection position change unit constituting the three-phase AC reactor according to the embodiment of the present invention;

FIG. 9C is a plan view of the input and output terminal block constituting the three-phase AC reactor according to the embodiment of the present invention;

FIG. 14 is a flowchart that explains a method for manufacturing the three-phase AC reactor according to the embodiment of the present invention.

DETAILED DESCRIPTION OF THE INVENTION

Figure 1:
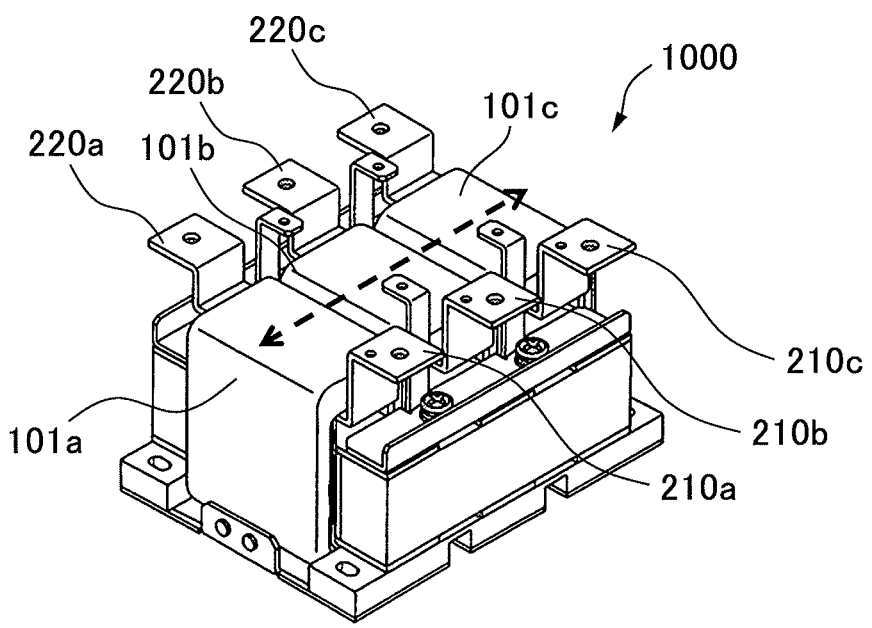
FIG. 1 is a perspective view of a conventional three-phase AC reactor in which the three-phase coils are arranged in parallel.
Figure 2A:
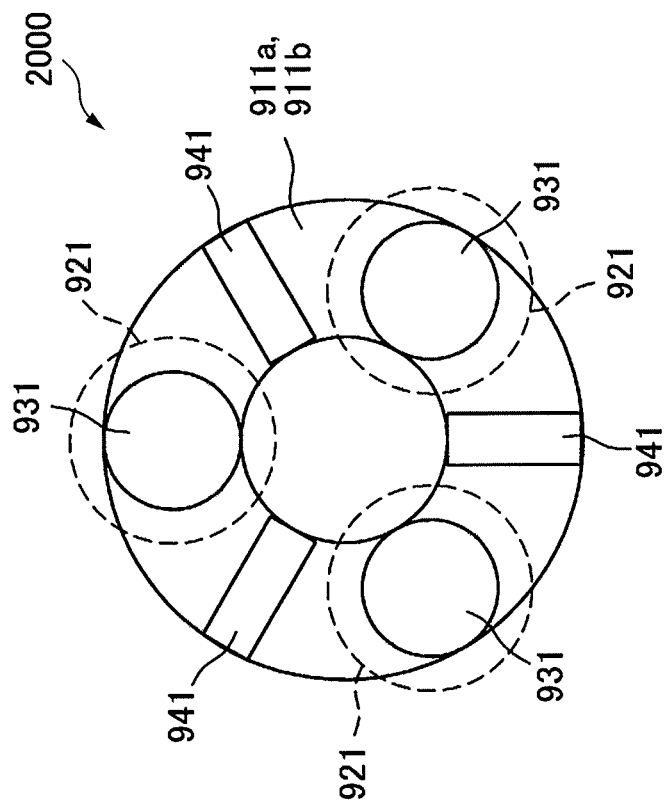
FIG. 2A is a perspective view of a conventional three-phase AC reactor in which the three-phase coils are not arranged in parallel.
Figure 2B:
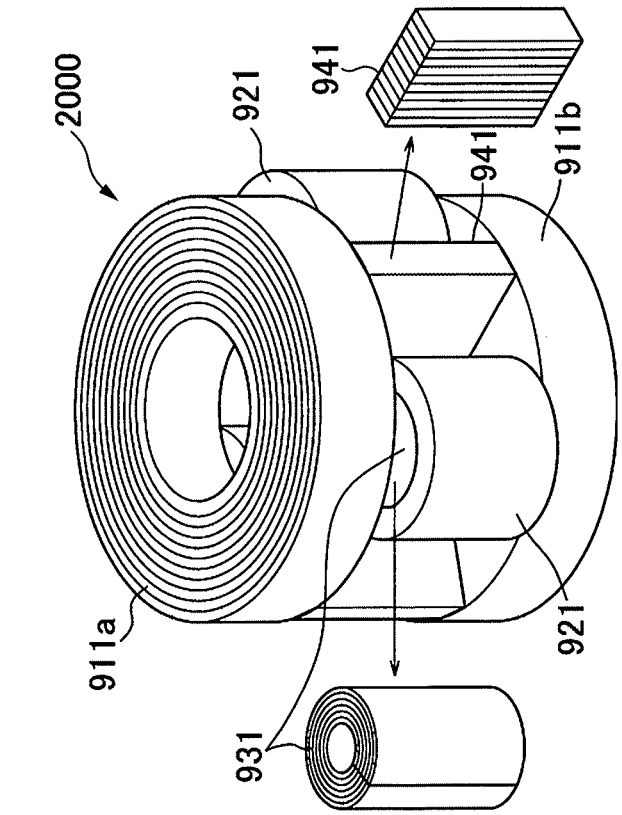
FIG. 2B is a plan view of a conventional three-phase AC reactor in which the three-phase coils are not arranged in parallel.
Figure 3:
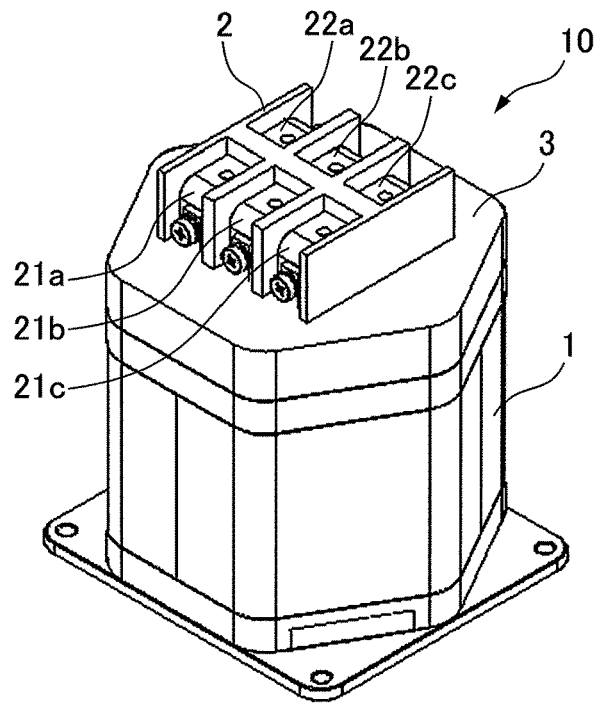
FIG. 3 is a perspective view of a three-phase AC reactor having an external connection position change unit according to an embodiment of the present invention.
Figure 4:
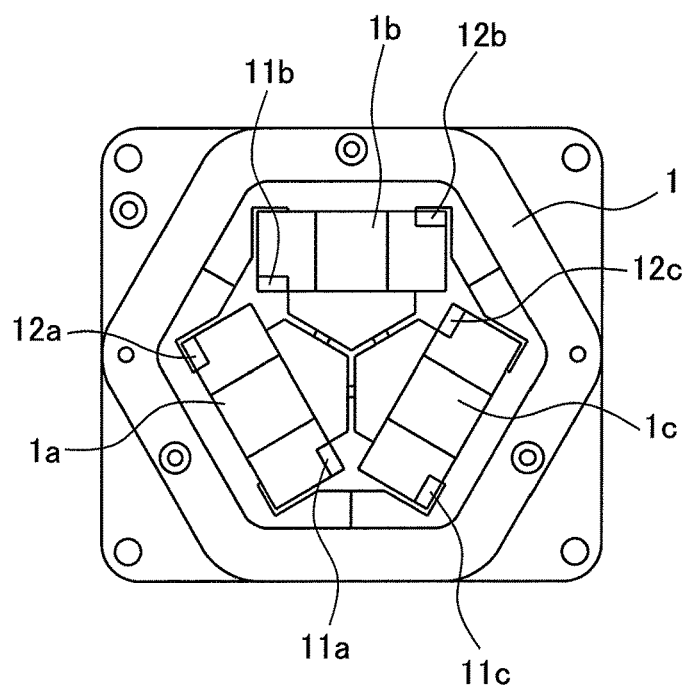
FIG. 4 is a plan view of the three-phase coils constituting the three-phase AC reactor according to the embodiment of the present invention.

A three-phase AC reactor according to the present invention will be described below with reference to the drawings. FIG. 3 is a perspective view of a three-phase AC reactor 10 according to an embodiment of the present invention. FIG. 4 is a plan view of the three-phase coils constituting the three-phase AC reactor according to the embodiment of the present invention. The three-phase AC reactor 10 according to the embodiment of the present invention has three-phase coils (1a, 1b, and 1c), an input and output terminal block 2, and an external connection position change unit 3. The three-phase coils (1a, 1b, and 1c) are located internally in a casing indicated by reference numeral 1.

As shown in FIG. 4, in the three-phase AC reactor according to the embodiment of the present invention, the three-phase coils (1a, 1b, and 1c) are arranged (apposed) neither in parallel nor in a linear manner. FIG. 5C is a perspective view of the three-phase coils constituting the three-phase AC reactor according to the embodiment of the present invention. The three-phase coils (1a, 1b, and 1c) are located internally in the casing 1. The first coil 1a has a first output coil end 11a and a first input coil end 12a. The second coil 1b has a second output coil end 11b and a second input coil end 12b. The third coil 1c has a third output coil end 11c and a third input coil end 12c. The coil ends are approximately equal in height with each other. For example, the first coil 1a may be an R-phase coil, the second coil 1b may be an S-phase coil, and the third coil 1c may be a T-phase coil. The "coil end" refers to an end of each coil.

As shown in FIG. 3, the input and output terminal block 2 has an input and output unit (21a, 21b, 21c, 22a, 22b, and 22c) having a parallel and linear arrangement (apposition). In other words, a first output terminal 21a, a second output terminal 21b, and a third output terminal 21c are arranged in a straight line, while a first input terminal 22a, a second input terminal 22b, and a third input terminal 22c are arranged in another straight line. The two straight lines are arranged (apposed) in parallel and in a linear manner. Such an arrangement is here referred to as "apposition".

Figure 5A:
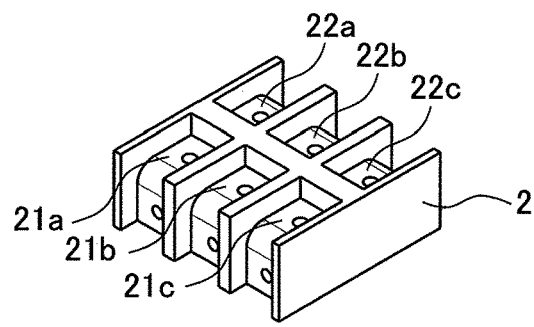
FIG. 5A is a perspective view of an input and output terminal block constituting the three-phase AC reactor according to the embodiment of the present invention.

FIG. 5A is a perspective view of the input and output terminal block 2 constituting the three-phase. AC reactor according to the embodiment of the present invention. As described later, the first output terminal 21a is electrically connected to the first output coil end 11a of the first coil 1a through a bus bar 31a. The first input terminal 22a is electrically connected to the first input coil end 12a of the first coil 1a through a bus bar 32a. The second output terminal 21b is electrically connected to the second output coil end 11b of the second coil 1b through a bus bar 31b. The second input terminal 22b is electrically connected to the second input coil end 12b of the second coil 1b through a bus bar 32b. The third output terminal 21c is electrically connected to the third output coil end 11c of the third coil 1c through a bus bar 31c. The third input terminal 22c is electrically connected to the third input coil end 12c of the third coil 1c through a bus bar 32c.

Figure 5B:
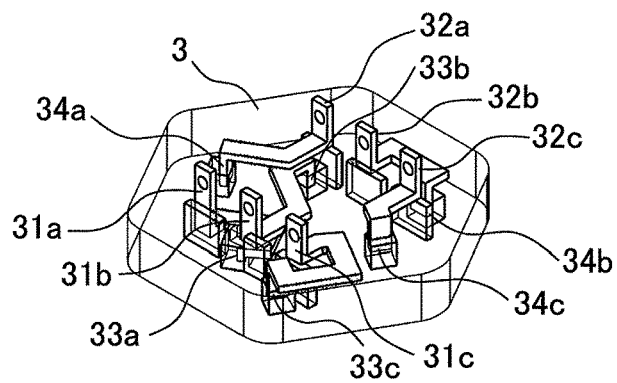
FIG. 5B is a perspective view of the external connection position change unit constituting the three-phase AC reactor according to the embodiment of the present invention.
Figure 5C:
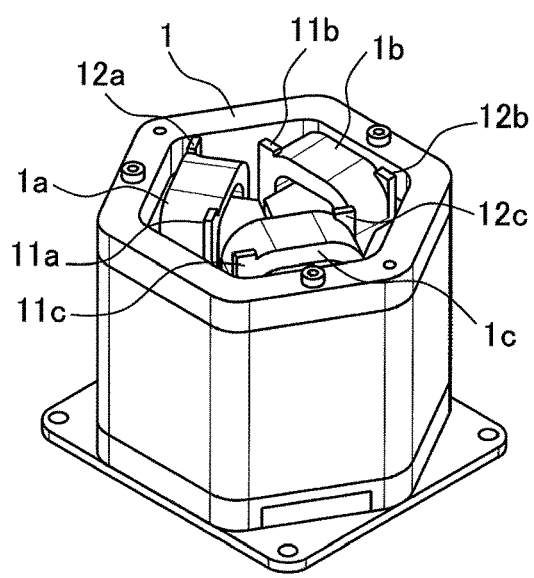
FIG. 5C is a perspective view of the three-phase coils constituting the three-phase AC reactor according to the embodiment of the present invention.

FIG. 5B is a perspective view of the external connection position change unit constituting the three-phase AC reactor according to the embodiment of the present invention. The external connection position change unit 3 is disposed between each of the coil ends (11a, 11b, 11c, 12a, 12b, and 12c) of the three-phase coils (1a, 1b, and 1c) and the input and output terminal block 2 so as to connect the coil ends to the input and output terminal block 2. The external connection position change unit 3 includes the first output terminal bus bar 31a, the first input terminal bus bar 32a, the second output terminal bus bar 31b, the second input terminal bus bar 32b, the third output terminal bus bar 31c, and the third input terminal bus bar 32c, which are molded in a resin or the like. The first output terminal bus bar 31a has one terminal 33a on the side of the first coil 1a and the other terminal on the other side that extend in a vertical direction with respect to a horizontal surface, and a portion between both of the terminals that extends in a horizontal direction. The other bus bars have similar structures.

The terminal 33a of the first output terminal bus bar 31a on the side of the first coil 1a is electrically connected to the first output coil end 11a of the first coil 1a. The terminal 34a of the first input terminal bus bar 32a on the side of the first coil 1a is electrically connected to the first input coil end 12a of the first coil 1a. The terminal 33b of the second output terminal bus bar 31b on the side of the second coil 1b is electrically connected to the second output coil end 11b of the second coil 1b. The terminal 34b of the second input terminal bus bar 32b on the side of the second coil 1b is electrically connected to the second input coil end 12b of the second coil 1b. The terminal 33c of the third output terminal bus bar 31c on the side of the third coil 1c is electrically connected to the third output coil end 11c of the third coil 1c.

The terminal 34c of the third input terminal bus bar 32c on the side of the third coil 1c is electrically connected to the third input coil end 12c of the third coil 1c.

The terminal of the first output terminal bus bar 31a on the side of the input and output terminal block 2 is electrically connected to the first output terminal 21a. The terminal of the first input terminal bus bar 32a on the side of the input and output terminal block 2 is electrically connected to the first input terminal 22a. The terminal of the second output terminal bus bar 31b on the side of the input and output terminal block 2 is electrically connected to the second output terminal 21b. The terminal of the second input terminal bus bar 32b on the side of the input and output terminal block 2 is electrically connected to the second input terminal 22b. The terminal of the third output terminal bus bar 31c on the side of the input and output terminal block 2 is electrically connected to the third output terminal 21c. The terminal of the third input terminal bus bar 32c on the side of the input and output terminal block 2 is electrically connected to the third input terminal 22c.

FIG. 3 shows in perspective a connection state of the input and output terminal block 2, the external connection position change unit 3, and the three-phase coils (1a, 1b, and 1c) shown in FIGS. 5A to 5C, which constitute the three-phase AC reactor according to the embodiment of the present invention. The external connection position change unit 3 preferably has a structure which is detachable from the coil ends and a connection unit of the input and output terminal block 2.

Figure 6B:
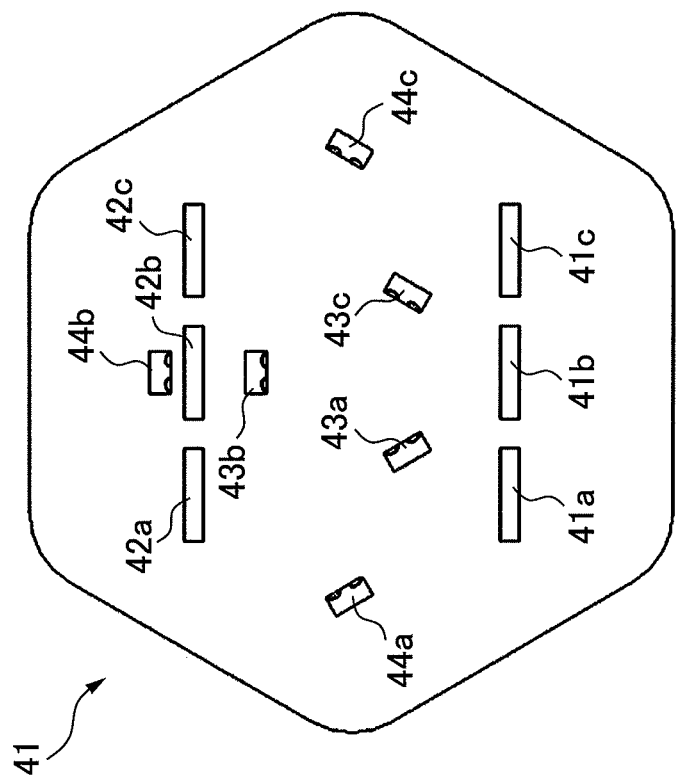
FIG. 6B is a plan view of a mold unit, for molding the non-intersecting bus bars therein, that constitutes the external connection position change unit according to the embodiment of the present invention.
Figure 6A:
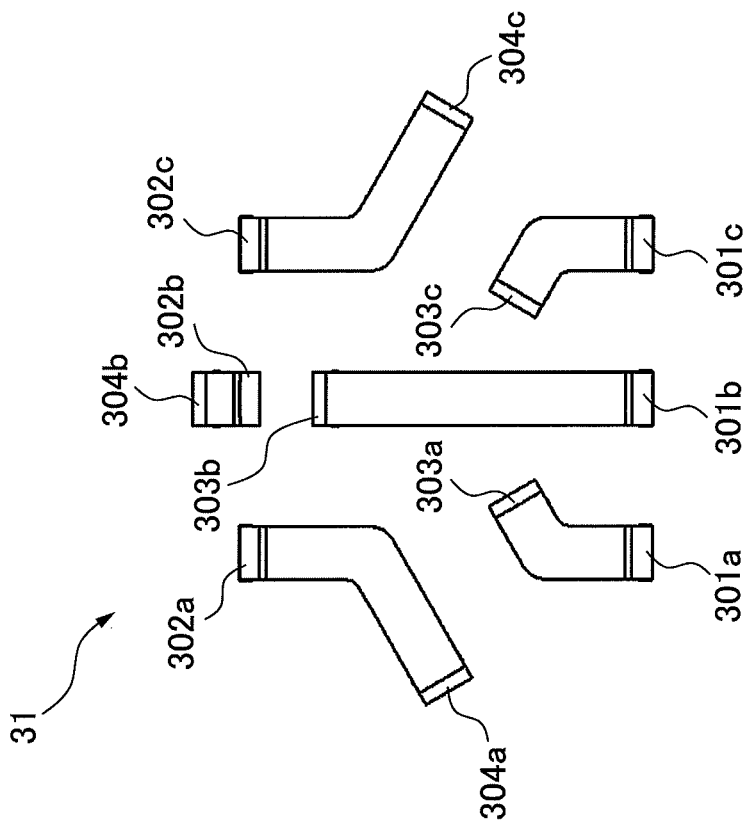
FIG. 6A is a plan view of non-intersecting bus bars that constitute another external connection position change unit according to the embodiment of the present invention.

In the above embodiment, the bus bars constituting the external connection position change unit partly intersect with each other. However, not limited to this structure, the bus bars constituting the external connection position change unit may not intersect with each other. FIG. 6A is a plan view of non-intersecting bus bars 31 that constitute the external connection position change unit 3 according to the embodiment of the present invention. FIG. 6B is a plan view of a mold unit 41 for molding the bus bars 31.

The bus bars 31 constituting the external connection position change unit 3 include a first output terminal bus bar 301a, a first input terminal bus bar 302a, a second output terminal bus bar 301b, a second input terminal bus bar 302b, a third output terminal bus bar 301c, and a third input terminal bus bar 302c, which are molded in a resin or the like. The first output terminal bus bar 301a has one terminal 303a on the side of the first coil 1a and the other terminal on the other side that extend in a vertical direction with respect to a horizontal surface, and a portion between both of the terminals that extends in a horizontal direction. The other bus bars have similar structures. The terminals 303a, 303b, and 303c of the first to third output terminal bus bars 301a, 301b, and 301c on the side of the first to third coils 1a, 1b, and 1c are connected to the output coil ends of the first to third coils 1a, 1b, and 1c, respectively, while the other terminals thereof on the other side are connected to the input and output terminal block 2. The terminals 304a, 304b, and 304c of the first to third input terminal bus bars 302a, 302b, and 302c on the side of the first to third coils 1a, 1b, and 1c are connected to the input coil ends of the first to third coils 1a, 1b, and 1c, respectively, while the other terminals thereof on the other side are connected to the input and output terminal block 2.

The mold unit 41 has a plurality of slots (41a to 41c, 42a to 42c, 43a to 43c, and 44a to 44c). Reference numeral 41a indicates an insertion slot for a metal part of the terminal block or a protrusion slot of the bus bar 301a (R-phase output). Reference numeral 41b indicates an insertion slot for a metal part of the terminal block or a protrusion slot of the bus bar 301b (S-phase output). Reference numeral 41c indicates an insertion slot for a metal part of the terminal block or a protrusion slot of the bus bar 301c (T-phase output). Reference numeral 42a indicates an insertion slot for a metal part of the terminal block or a protrusion slot of the bus bar 302a (R-phase input). Reference numeral 42b indicates an insertion slot for a metal part of the terminal block or a protrusion slot of the bus bar 302b (S-phase input). Reference numeral 42c indicates an insertion slot for a metal part of the terminal block or a protrusion slot of the bus bar 302c (T-phase input).

Reference numeral 43a indicates an insertion slot of the coil end or a protrusion slot of the bus bar 301a (R-phase output). Reference numeral 43b indicates an insertion slot of the coil end or a protrusion slot of the bus bar 301b (S-phase output). Reference numeral 43c indicates an insertion slot of the coil end or a protrusion slot of the bus bar 301c (T-phase output). Reference numeral 44a indicates an insertion slot of the coil end or a protrusion slot of the bus bar 302a (R-phase input). Reference numeral 44b indicates an insertion slot of the coil end or a protrusion slot of the bus bar 302b (S-phase input). Reference numeral 44c indicates an insertion slot of the coil end or a protrusion slot of the bus bar 302c (T-phase input).

The terminals of the bus bars can be formed in various shapes. For example, when using pressure welding such as a connector, at least the coil ends or the terminals of the input and output terminal block are detachable from the bus bars. In this case, the mold unit is provided with insertion slots for the terminals. When using screwing, at least the coil ends or the terminals of the input and output terminal block can be screwed to the bus bars.

Figure 7A:
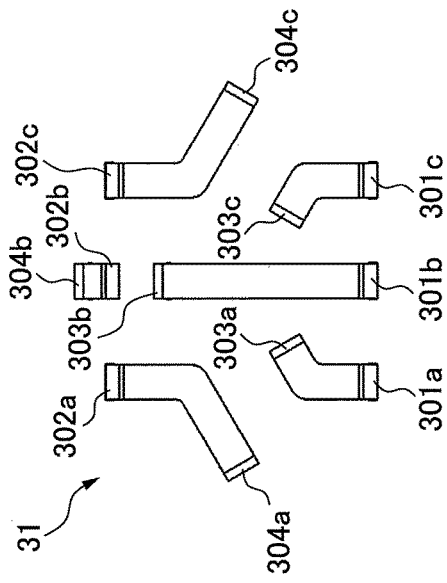
FIG. 7A is a perspective view of the non-intersecting bus bars that constitute the external connection position change unit according to the embodiment of the present invention.
Figure 7B:
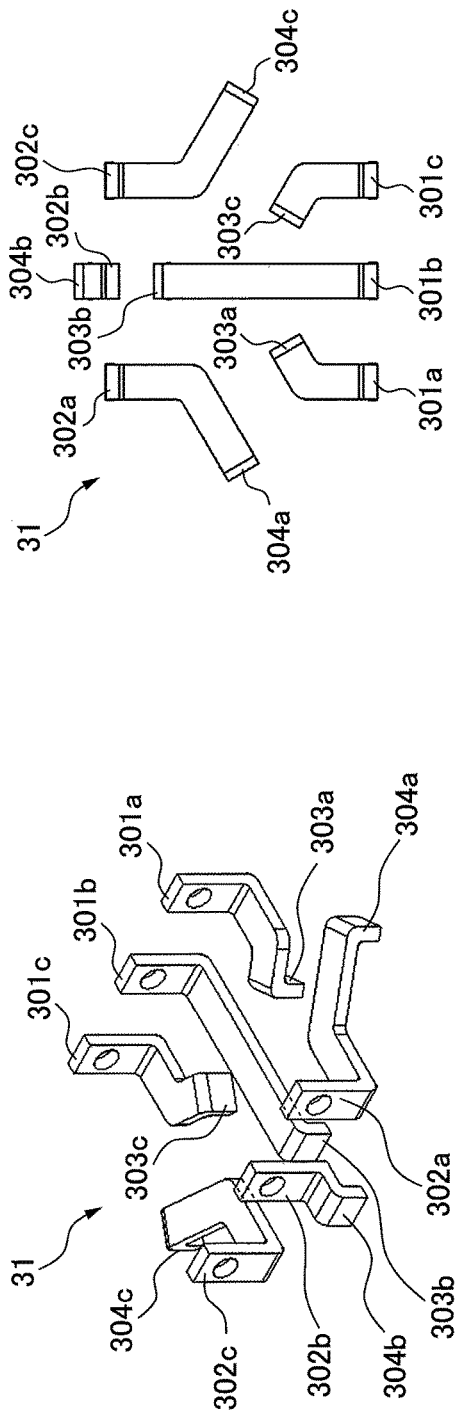
FIG. 7B is a plan view of the non-intersecting bus bars that constitute the external connection position change unit according to the embodiment of the present invention.
Figure 7C:
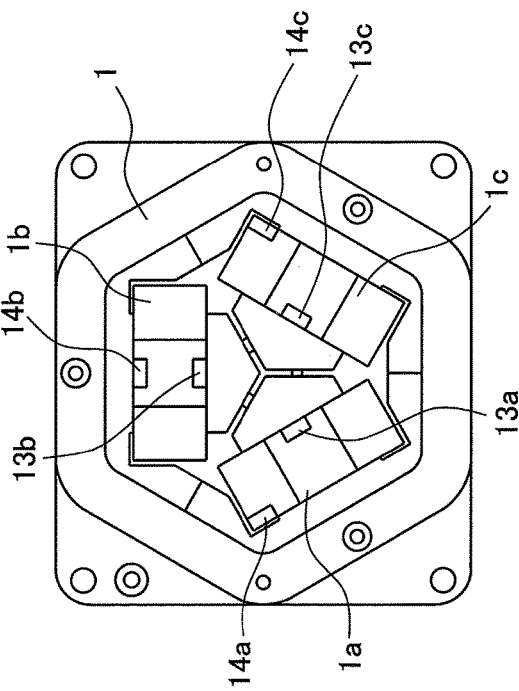
FIG. 7C is a plan view of three-phase coils for the external connection position change unit of the three-phase AC reactor according to the embodiment of the present invention.

Next, the connection between the non-intersecting bus bars, which constitute the external connection position change unit according to the embodiment of the present invention, and the coil ends will be described. FIGS. 7A and 7B are a perspective view and a plan view of the non-intersecting bus bars that constitute the external connection position change unit according to the embodiment of the present invention, respectively. FIG. 7C is a plan view of the three-phase coils constituting the three-phase AC reactor. An output terminal 13a of the first coil (e.g., R-phase coil) 1a is connected to the terminal 303a of the first output terminal bus bar 301a on the side of the first coil 1a. An output terminal 13b of the second coil (e.g., S-phase coil) 1b is connected to the terminal 303b of the second output terminal bus bar 301b on the side of the second coil 1b. An output terminal 13c of the third coil (e.g., T-phase coil) 1c is connected to the terminal 303c of the third output terminal bus bar 301c on the side of the third coil 1c. An input terminal 14a of the first coil (e.g., R-phase coil) 1a is connected to the terminal 304a of the first input terminal bus bar 302a on the side of the first coil 1a. An input terminal 14b of the second coil (e.g., S-phase coil) 1b is connected to the terminal 304b of the second input terminal bus bar 302b on the side of the second coil 1b. An input terminal 14c of the third coil (e.g., T-phase coil) 1c is connected to the terminal 304c of the third input terminal bus bar 302c on the side of the third coil 1c. The non-intersecting bus bars allow for easy obtainment of an insulating distance between the bus bars of different phases while minimizing the height of the external connection position change unit, thus resulting in a reduction in size of the external connection position change unit. The external connection position change unit is not necessarily molded with a resin, but resin molding facilitates the easy obtainment of the insulating distance and hence allows further miniaturization.

Next, the connection between the intersecting bus bars, which constitute the external connection position change unit according to the embodiment of the present invention, and the coil ends will be described. FIGS. 8A and 8B are a perspective view and a plan view of intersecting bus bars 32 that constitute the external connection position change unit 3 according to the embodiment of the present invention, respectively. FIG. 8C is a plan view of the three-phase coils constituting the three-phase AC reactor. The output coil end 11a of the first coil (e.g., R-phase coil) 1a is connected to the terminal 33a of the first output terminal bus bar 31a on the side of the first coil 1a. The output coil end 11b of the second coil (e.g., S-phase coil) 1b is connected to the terminal 33b of the second output terminal bus bar 31b on the side of the second coil 1b. The output coil end 11c of the third coil (e.g., T-phase coil) 1c is connected to the terminal 33c of the third output terminal bus bar 31c on the side of the third coil 1c. The input coil end 12a of the first coil (e.g., R-phase coil) 1a is connected to the terminal 34a of the first input terminal bus bar 32a on the side of the first coil 1a. The input coil end 12b of the second coil (e.g., S-phase coil) 1b is connected to the terminal 34b of the second input terminal bus bar 32b on the side of the second coil 1b. The input coil end 12c of the third coil (e.g., T-phase coil) 1c is connected to the terminal 34c of the third input terminal bus bar 32c on the side of the third coil 1c. In the example shown in FIGS. 8A and 8B, the bus bars 31a and 31b partly overlap, and the bus bars 31b and 32a partly overlap. The partly overlapping bus bars allow the coil ends to protrude as-is to the side of the input and output terminals, without shifting the positions of the coil ends, when the bus bars are connected to the coils. In other words, the coil ends are normally situated on both end portions of each coil, and the partly overlapping bus bars eliminate the need for shifting the positions of the coil ends. On the contrary, as shown in FIG. 7C, the non-overlapping bus bars require at least part of the coil ends to shift from the end portions to middle portions. The above embodiment describes an instance where the bus bars 31a and 31b partly overlap, and the bus bars 31b and 32a partly overlap. However, the overlapping positions of the bus bars are not limited to the above, and other bus bars may partly overlap.

Figure 10B:
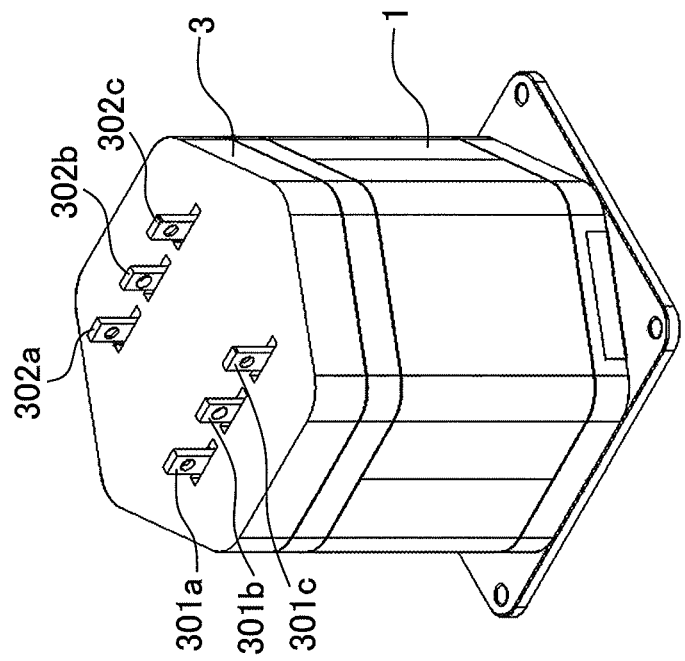
FIG. 10B is a drawing showing the connection (by pressure welding using a connector) between the three-phase coils and the external connection position change unit that constitute the three-phase AC reactor according to the embodiment of the present invention.
Figure 10A:
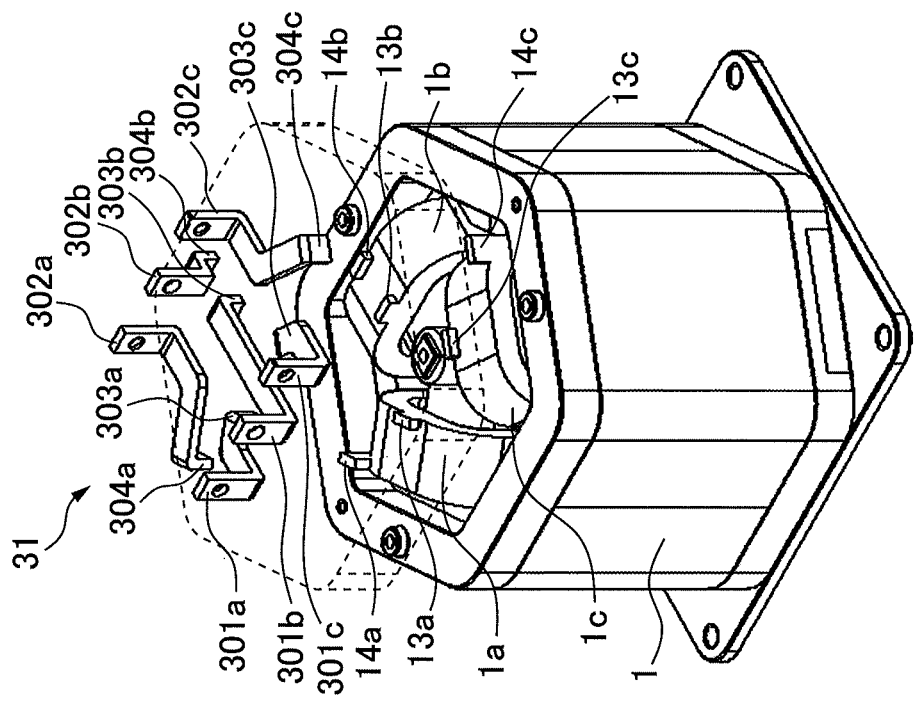
FIG. 10A is a drawing showing the connection (by pressure welding using a connector) between the three-phase coils and the external connection position change unit that constitute the three-phase AC reactor according to the embodiment of the present invention.

FIGS. 9A to 9C are plan views of the three-phase coils, the external connection position change unit, and the input and output terminal block, respectively, that constitute the three-phase AC reactor according to the embodiment of the present invention. FIGS. 10A and 10B are perspective views of the three-phase coils and the external connection position change unit that constitute the three-phase AC reactor according to the embodiment of the present invention before and after assembly, respectively. As shown in FIG. 9A, the R-phase output terminal 13a of the first coil (R-phase coil) 1a, the S-phase output terminal 13b of the second coil (S-phase coil) 1b, and the T-phase output terminal 13c of the third coil (T-phase coil) 1c, which constitute the three-phase AC reactor, are not aligned (apposed). In the same manner, the R-phase input terminal 14a of the first coil (R-phase coil) 1a, the S-phase input terminal 14b of the second coil (S-phase coil) 1b, and the T-phase input terminal 14c of the third coil (T-phase coil) 1c are not aligned (apposed). Thus, when an external device is connected to the coils (1a, 1b, and 1c) of individual phases, the connection terminals of the external device have to be situated in accordance with the positions of the input and output terminals of the coils of the individual phases, thus hindering easy connection.

Against this problem, the three-phase AC reactor according to the embodiment of the present invention is provided with the external connection position change unit 3 between the coils (1a, 1b, and 1c) of individual phases of the three-phase AC reactor and the input and output terminal block 2, in order to ease connection between the coils of individual phases of the three-phase AC reactor and an external device.

In other words, as shown in FIG. 10A, the R-phase output terminal 13a, the S-phase output terminal 13b, and the T-phase output terminal 13c are connected to the terminal 303a of the bus bar 301a on the side of the first coil 1a, the terminal 303b of the bus bar 301b on the side of the second coil 1b, and the terminal 303c of the bus bar 301c on the side of the third coil 1c, respectively. The terminals of the bus bars 301a, 301b, and 301c on the sides opposite the terminals 303a, 303b, and 303c, which are situated on the sides of the first to third coils 1a to 1c, (on the side of the input and output terminal block) are aligned. In the same manner, the R-phase input terminal 14a, the S-phase input terminal 14b, and the T-phase input terminal 14c are connected to the terminal 304a of the bus bar 302a on the side of the first coil 1a, the terminal 304b of the bus bar 302b on the side of the second coil 1b, and the terminal 304c of the bus bar 302c on the side of the third coil 1c, respectively. The terminals of the bus bars 302a, 302b, and 302c on the sides opposite the terminals 304a, 304b, and 304c, which are situated on the sides of the first to third coils 1a to 1c, (on the side of the input and output terminal block) are aligned. As a result, the apposition of the terminals of the bus bars of the external connection position change unit 3 allows easy connection between the coils of individual phases of the three-phase AC reactor and an external device.

Figure 11A:
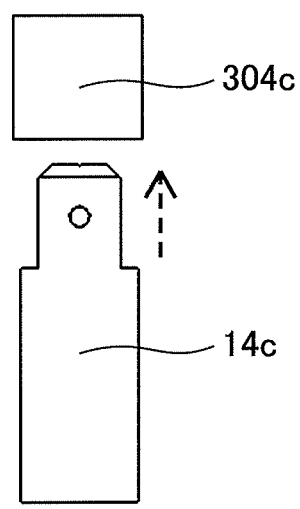
FIG. 11A is a plan view of a coil end insertion slot of the external connection position change unit and a coil end according to the embodiment of the present invention.
Figure 11B:
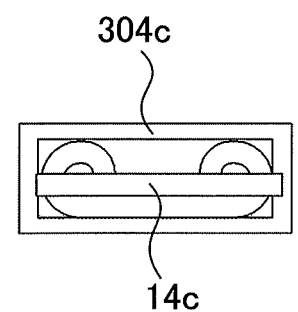
FIG. 11B is a sectional view of the coil end insertion slot of the external connection position change unit and the coil end according to the embodiment of the present invention.

Next, a method for connecting the external connection position change unit and the coil ends will be described with reference to FIGS. 11A and 11B. FIG. 11A is a plan view of a coil end insertion slot of the external connection position change unit 3 and the coil end according to the embodiment of the present invention, and FIG. 11B is a sectional view thereof. For example, as shown in FIG. 11A, the input terminal 14c of the third coil (T-phase coil) 1c, as a coil end, is inserted into the terminal 304c of the third input terminal bus bar 302c on the side of the third coil 1c, as a coil end insertion slot, in the direction of the arrow to connect the coil end to the bus bar.

When the external connection position change unit 3 is connected to the coils, as shown in FIG. 10B, the terminals of the bus bars 301a, 301b, and 301c are aligned (apposed). As a result, as shown in FIG. 9C, it is possible to easily connect the terminals of the bus bars 301a, 301b, and 301c to the R-phase first output terminal 21a, the S-phase second output terminal 21b, and the T-phase third output terminal 21c of the input and output terminal block 2, respectively.

In the same manner, as shown in FIG. 10A, the R-phase input terminal 14a, the S-phase input terminal 14b, and the T-phase input terminal 14c are connected to the terminal 304a of the bus bar 302a on the side of the first coil 1a, the terminal 304b of the bus bar 302b on the side of the second coil 1b, and the terminal 304c of the bus bar 302c on the side of the third coil 1c, respectively.

When the external connection position change unit 3 is connected to the coils, as shown in FIG. 10B, the terminals of the bus bars 302a, 302b, and 302c are aligned (apposed). As a result, as shown in FIG. 9C, it is possible to easily connect the terminals of the bus bars 302a, 302b, and 302c to the R-phase first input terminal 22a, the S-phase second input terminal 22*b*, and the T-phase third input terminal 22*c* of the input and output terminal block 2, respectively.

Figure 12B:
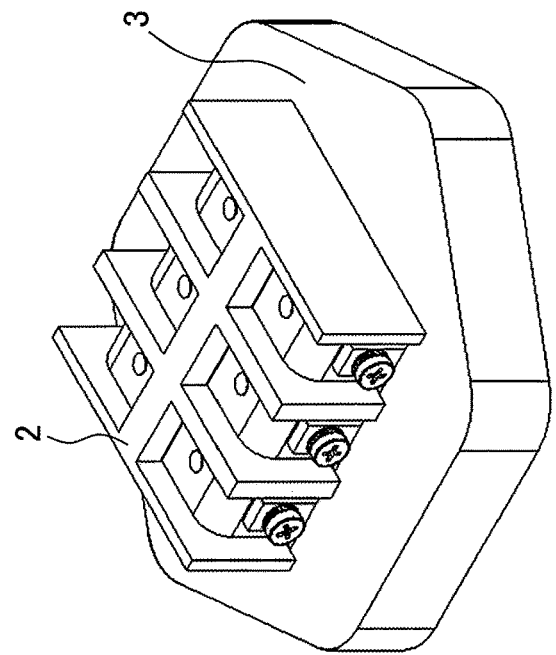
FIG. 12B is a drawing showing the connection (by screwing) between the external connection position change unit and the input and output terminal block according to the embodiment of the present invention.
Figure 12A:
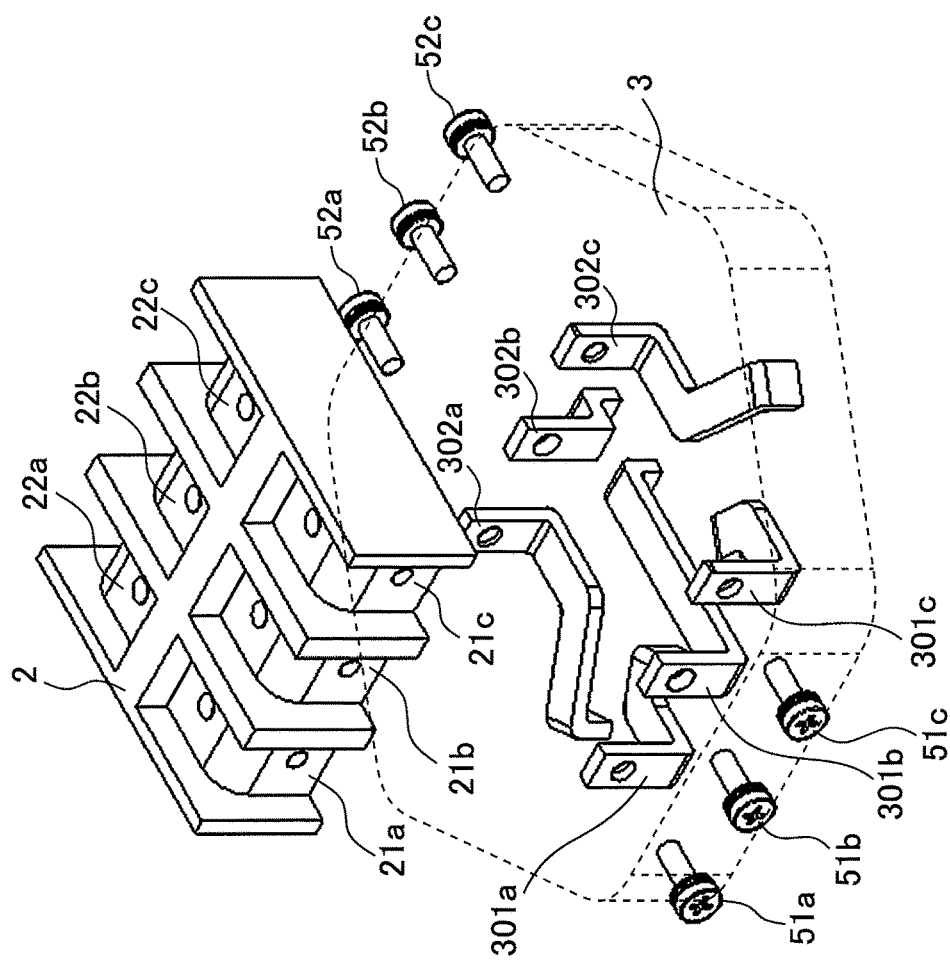
FIG. 12A is a drawing showing the connection (by screwing) between the external connection position change unit and the input and output terminal block according to the embodiment of the present invention.

Next, a method for connecting the input and output terminal block 2 to the external connection position change unit 3 will be described. FIGS. 12A and 12B show an example in which the connection between the input and output terminal block and the external connection position change unit according to the embodiment of the present invention is performed by screwing. FIG. 12A shows a state before screwing, while FIG. 12B shows a state after screwing. For example, after a hole formed in the bus bar 301*a* is aligned with a hole formed in the first output terminal 21*a* of the input and output terminal block 2, a screw 51*a* is screwed into the holes. In the same manner, after a hole formed in the bus bar 301*b* is aligned with a hole formed in the second output terminal 21*b* of the input and output terminal block 2, a screw 51*b* is screwed into the holes. In the same manner, after a hole formed in the bus bar 301*c* is aligned with a hole formed in the third output terminal 21*c* of the input and output terminal block 2, a screw 51*c* is screwed into the holes. As to the input terminals, in the same manner, after a hole formed in each of the input terminal bus bars 302*a*, 302*b*, and 302*c* is aligned with a hole formed in each of the first to third input terminals 22*a*, 22*b*, and 22*c* of the input and output terminal block 2, each screw 52*a*, 52*b*, or 52*c* is screwed into the holes.

The connection between the coil ends and the external connection position change unit 3 and the connection between the external connection position change unit 3 and the input and output terminal block 2 may be performed by any of screwing and pressure welding using a connector and the like. At least one of the connection between the coil ends and the external connection position change unit 3 and the connection between the external connection position change unit 3 and the input and output terminal block 2 is performed by pressure welding using a connector and the like.

According to the three-phase AC reactor of the embodiment of the present invention, the coil ends of the non-apposed rectangular wire coils are changed in position to be connected to an external device, as connection parts arranged side by side, thus allowing easy connection to the external device.

Next, a method for manufacturing the three-phase AC reactor according to the embodiment of the present invention will be described. The method for manufacturing the three-phase AC reactor according to the embodiment of the present invention includes a step of inserting the terminals of the bus bars of the external connection position change unit 3 on the side of the individual three-phase coils onto the coil ends to establish connection, and a step of inserting the input and output terminals of the input and output terminal block 2 onto the terminals of the external connection position change unit 3 on the side of the input and output terminal block to establish connection.

Figure 13B:
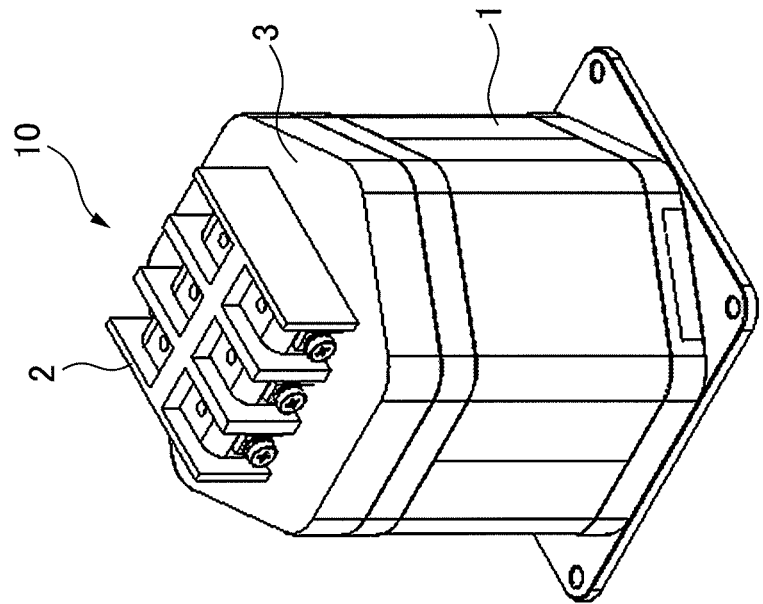
FIG. 13B is a perspective view showing the entire structure of the three-phase AC reactor according to the embodiment of the present invention.
Figure 13A:
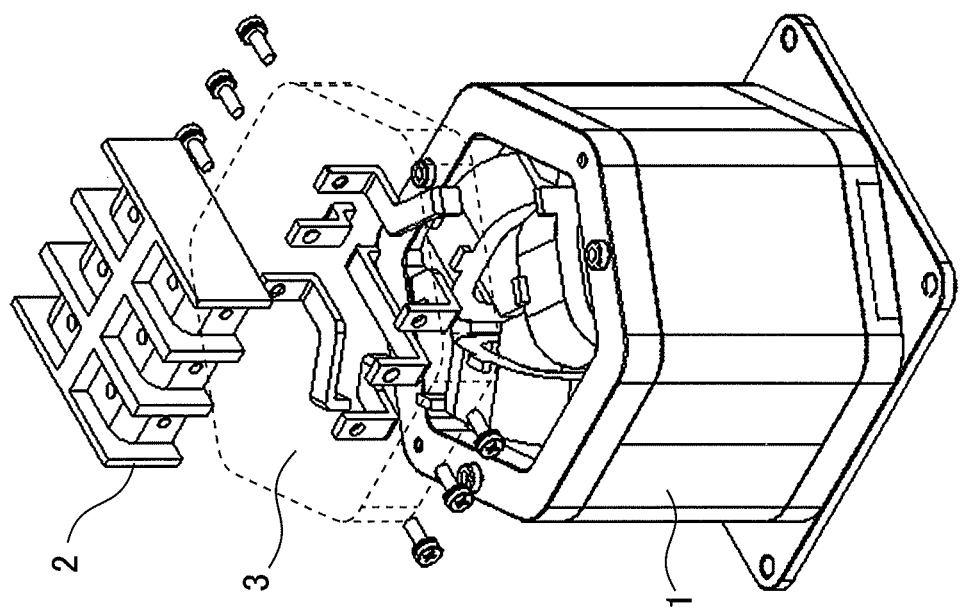
FIG. 13A is a drawing in which the components of the three-phase AC reactor according to the embodiment of the present invention are exploded.

FIGS. 13A and 13B are exploded views of the three-phase AC reactor 10 according to the embodiment of the present invention. FIG. 13A shows a state before the external connection position change unit 3 and the input and output terminal block are connected to the three-phase AC reactor, while FIG. 13B shows a state after connection. FIG. 14 is a flowchart that explains the method for manufacturing the three-phase AC reactor according to the embodiment of the present invention. In step S101, the terminals (33*a*, 34*a*, 33*b*, 34*b*, 33*c*, and 34*c*) of the bus bars (31*a*, 32*a*, 31*b*, 32*b*, 31*c*, and 32*c*) of the external connection position change unit 3 on the side of the individual three-phase coils are inserted onto the coil ends (11*a*, 12*a*, 11*b*, 12*b*, 11*c*, and 12*c*) to establish connection (see FIGS. 10A and 11).

Next, in step S102, the input and output terminals (21*a*, 21*b*, 21*c*, 22*a*, 22*b*, and 22*c*) of the input and output terminal block 2 are inserted onto the terminals of the bus bars (31*a*, 31*b*, 31*c*, 32*a*, 32*b*, and 32*c*) of the external connection position change unit 3 on the side of the input and output terminal block 2 to establish connection (see FIGS. 13A and 13B).

The above describes an instance in which the bus bars and the input and output terminal block are formed separately, but the bus bars and the input and output terminal block may be integrated into one unit. The integrated structure can omit the step of connecting the input and output terminal block to the bus bars.

According to the method for manufacturing the three-phase AC reactor of the embodiment of the present invention, in a manufacturing process of the AC reactor having the non-apposed rectangular wire coils on the precondition of automation, the coil ends of the three-phase AC reactor can be connected to the input and output connection parts only by inserting the coil ends of the rectangular wire coils into the external connection position change unit, thus facilitating the automation of the manufacturing process.

The three-phase AC reactor according to the embodiment of the present invention allows easy connection to an external device, even when the three-phase coils are arranged (apposed) neither in parallel nor in a linear manner.

What is claimed is:

1. A three-phase AC reactor comprising:
   three-phase coils arranged inside a casing neither in parallel with each other nor in a linear manner, each of the three-phase coils having coil ends arranged in a first pattern relative to each other;
   an input and output terminal block having an input and output unit having terminals arranged in a second pattern that is parallel and linear with respect to each other; and
   an external connection position change unit:
   1) mounted to the casing between a coil end of each of the three-phase coils and the input and output terminal block,
   2) enclosing the three-phase coils arranged within the casing, and
   3) including respective bus bars having first ends arranged in the first pattern for mating with the coil ends of the three-phase coils, and having second ends arranged in the second pattern for mating with the terminals of the input and output terminal block, the respective bus bars electrically connecting the three-phase coils to the input and output terminal block.

2. The three-phase AC reactor according to claim 1, wherein the external connection position change unit is detachable from at least one of the coil end and a connection unit of the input and output terminal block.

3. The three-phase AC reactor according to claim 1, wherein the external connection position change unit has a shape that matches a shape of the casing.

* * * * *